United States Patent [19]
Carini

[11] 3,919,034
[45] Nov. 11, 1975

[54] JOINING PLASTIC ELEMENTS

[75] Inventor: Piertommaso Carini, Sondrio, Italy

[73] Assignee: The Dow Chemical Company, Midland, Mich.

[22] Filed: Mar. 5, 1974

[21] Appl. No.: 448,442

[52] U.S. Cl. .................. 156/304; 156/306; 428/53
[51] Int. Cl.² ........................................ B29C 19/00
[58] Field of Search .... 156/77, 78, 157, 293, 303.1, 156/304, 306; 52/309, 615; 161/159–161, 36, 37, 38, 44

[56] References Cited
UNITED STATES PATENTS

| | | | |
|---|---|---|---|
| 3,546,841 | 12/1970 | Smith et al. | 52/309 |
| 3,564,801 | 2/1971 | Huerta | 52/309 |
| 3,625,808 | 12/1971 | Martin | 52/309 |
| 3,635,280 | 1/1972 | Parsons | 156/304 |
| 3,815,657 | 6/1974 | Malek et al. | 52/309 |

FOREIGN PATENTS OR APPLICATIONS

| | | | |
|---|---|---|---|
| 2,024,314 | 12/1971 | Germany | 156/304 |

*Primary Examiner* — William A. Powell
*Assistant Examiner* — Brian J. Leitten
*Attorney, Agent, or Firm* — Robert B. Ingraham

[57] ABSTRACT

Elongate thermoplastic foam strips are butt welded employing a tongue and groove joint wherein the initial form of the tongue is larger than the groove and the tongue-containing portion is heat formed immediately prior to abutting the elements. A stronger butt weld is obtained and optionally the pieces are self-centering in one plane.

6 Claims, 5 Drawing Figures

JOINING PLASTIC ELEMENTS

Oftentimes it is desirable to butt weld elongate strips or planks of thermoplastic resinous foam to form long continuous strips. Such strips are frequently employed in the fabrication of structures by the so-called spiral generation process. Such a process is shown in U.S. Pat. No. 3,206,899. While long continuous strips of plastic foam may be prepared by extrusion, in many instances it is much more desirable to employ foam which is aged and dimensionally stabilized and join a number of such shorter strips in end to end relationship to provide the desired work piece. Oftentimes, particularly when spiral generation is employed for cryogenic insulation, such elongate strips are prepared by laminating several smaller preformed strips. A considerable difficulty exists in joining such shorter lengths in an end to end abutting relationship because of the nature of the spiral generation process. It is desirable to maintain a generally constant cross-sectional area in the elongate strips as such joining under field conditions must be accomplished rapidly. Adhesives are generally undesirable. In the past such butt welds have generally been prepared by positioning two elements to be joined in a jig, placing one or both elements into contact with a planar heated platen until a sufficient quantity of the thermoplastic foam is melted or heat plastified. The platen is quickly withdrawn and the heated ends butted together and maintained in position until at least a peripheral portion of the heat plastified material has hardened. Such butt welds generally provide a region of weakness in the resultant elongate strip. In many instances the elongate strip must be conveyed a considerable distance before it is incorporated into a structure. Any breakage results in substantial loss of time and effort.

It would be desirable if there were available an improved method for the butt welding of thermoplastic synthetic resinous foam elements.

It would also be desirable if there were available an improved method for the joining of synthetic resinous thermoplastic elements which provided a reliable high strength joint.

It would further be desirable if there were available a method of joining synthetic resinous elongate elements in such a manner that the joint was self-centering in at least one plane.

These benefits and other advantages in accordance with the present invention are achieved in a method for the butt welding of two elongate synthetic resinous thermoplastic foam elements, the method comprising providing a first foam element having an end to be joined and a second foam element having an end to be joined, forming on the end of the first foam element a recess extending inwardly and generally axially and laterally, the elongate element forming on the end of the second element to be joined a protuberance having one surface adapted to mate with at least one surface of the recess, the mating surfaces extending generally transverse to the longitudinal axis of the elements, the protuberance extending outwardly in an axial direction for a distance less than the depth of the recess, the protuberance being of a sufficient size to prevent mating of the surfaces of the protuberance and recess, subsequently heating a portion of an end surface of the second elongate member sufficient to heat plastify the thermoplastic foam and cause collapse of a portion thereof sufficient to deform the protuberance to mate with the recess, abutting the ends to be joined of the first and second members thereby cooling at least a portion of the heat plastified foam in contact with the end to be joined of the first member and adhering the first and second members together. The method of the present invention may be readily practiced with any thermoplastic foam which is heat weldable.

Further features and advantages of the present invention will become more apparent from the following specification taken in connection with the drawing wherein.

Figure 1:
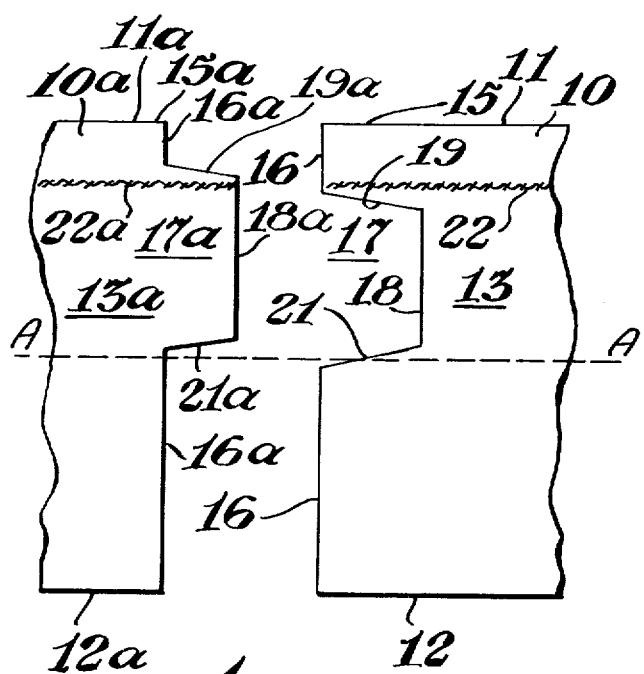
FIG. 1 is a schematic representation of elongate elements having adjacent ends prepared for joining.

In FIG. 1 there is schematically depicted a fractional view of a first elongate synthetic resinous thermoplastic foam element 10 and a second generally similar foam element 10a. The element 10 has a generally rectangular cross-sectional configuration and first and second opposed surfaces 11 and 12 which, for purposes of illustration, can be considered as the outside and inside surfaces, respectively. A third side 13 is visible extending from the surfaces 11 and 12 and at right angles thereto. The side 13 can be considered to be a top side. The element 10 has an end to be joined 15. The end 15 has an end surface 16 extending generally perpendicular to a longitudinal axis A of both elements 10 and 10a. Formed within the end surface 16 is a recess 17 defined by a surface 18 extending generally parallel to the surface 16 and an outwardly flaring surface 19 generally adjacent the surface 11 and a second outwardly flaring surface 21 remote from the surface 11 and generally adjacent the surface 12. Within the element 10 is disposed a generally planar crack barrier means or reinforcement 22 such as a barrier of glass, metal, plastic, natural fiber or perforate sheet and the like. The reinforcement 22 is disposed in a plane spaced from and extending generally parallel to the surface or outside 11. The element 10a has an outside surface 11a, an inside surface 12a, a top surface 13a which is depicted in FIG. 1. Surfaces having a similar number are generally coplanar. A surface 16a is disposed on an end 15a of the element 10a to be joined to the end 15 of the element 10. A protuberance 17a is defined by the end 15a and is bounded by surfaces 19a and 21a which, if projected, converge away from the surface 16a. The surfaces 19a and 21a are joined by a surface 18a which is disposed in a plane generally perpendicular to the longitudinal axis A. The protuberance 17a has a greater lateral dimension than the recess 17 and the height of the protuberance; that is, the distance between a plane containing the surface 18a and the surface 16a, is substantially less than the depth of the groove or the distance between planes containing surfaces 16 and 18.

Figure 2:
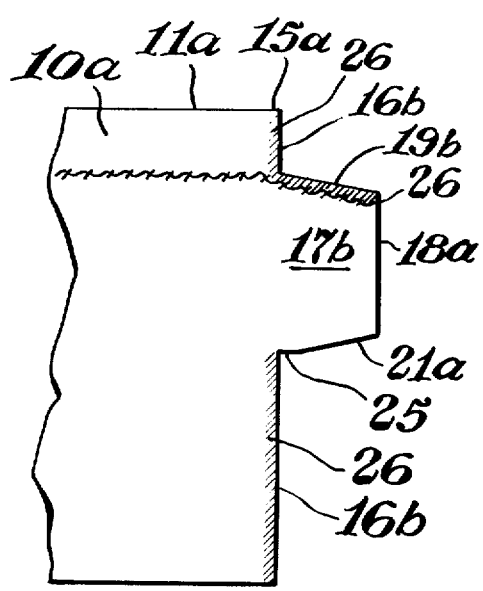
FIG. 2 is a representation of an element having a protuberance after having been heat formed.

FIG. 2 depicts a view of the element 10a after the application of a heating platen to the end 15a. The surfaces 16a and 19a have been contacted with a heated platen to form new surfaces 16b, 19b and a generally axially extending surface 25 adjacent the surface 21a. The cross-hatched portions adjacent the surfaces 16b and 19b indicate the presence of heat plastified thermoplastic resinous polymer and are designated by the reference numeral 26. The reinforcing scrim or crack barrier means 22a which extends into the protuberance 17b has been displaced by the melting or heat plastification of a portion of the foam to position it generally parallel to the surface 19b.

Figure 3:
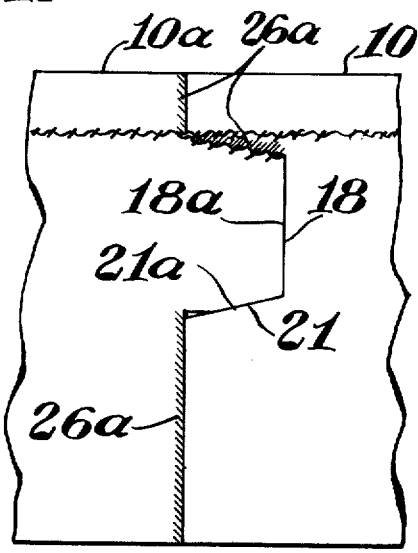
FIG. 3 illustrates the first and second elements in abutted adhered relationship.

In FIG. 3 there is depicted a schematic representation of elements 10 placed in mating relationship with the element 10a of FIG. 2. The surfaces 21 and 21a provide a camming effect which conveniently causes the two ends to be self-centering in the plane of the illustration. The surfaces 18 and 18a are in abutting relationship and effectively prevent undue distortion of the heat plastified foam in the regions of the welds designated by the reference numeral 26a. By choosing the position of the protuberance in recess or tongue and groove, advantageously the reinforcing scrim of the element 10a is placed in close proximity to the scrim of the element 10 and the resultant joint is found to be readily reproducible and resistant to breakage.

Figure 4:
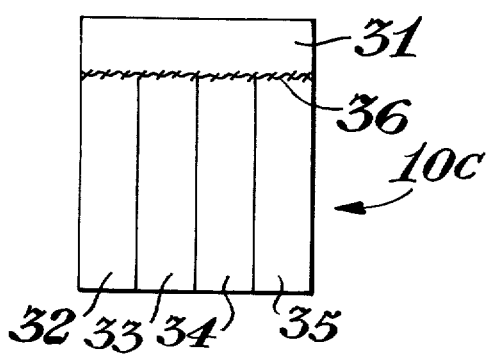
FIG. 4 is an end view of an unformed laminated element suited for the practice of the present invention.

FIG. 4 schematically depicts an end view of an elongate element designated by the reference numeral 10c which oftentimes is desirable when the method of the invention is employed to prepare cryogenic insulation. The element 10c has a first plank 31 which is adhered to four planks 32, 33, 34 and 35 in such a manner that the four planks are in stacked face to face arrangement with one edge of each adhered to a major face of the plank 31. A reinforcing scrim or crack barrier means 36, such as glass fabric reinforcing or open weave glass fabric, is disposed at the interface between the plank 31 and the planks 32, 33, 34 and 35. The exposed major surface of the plank 31 is generally equivalent to the faces 11 and 11a of FIG. 1.

Figure 5:
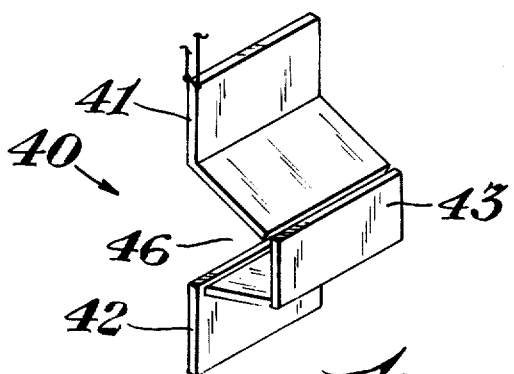
FIG. 5 is a schematic side view of a heating arrangement for the practice of the method of the invention.

In FIG. 5 there is a schematic isometric representation of heating apparatus for the practice of the present invention generally designated by the reference numeral 40. The apparatus 40 comprises a first heating platen 41, a second heating platen 42 and an unheated stop member 43. The platen 42 has a generally planar configuration while the platen 41 and the member 43 have a generally L-shaped configuration. The platens 41 and 42 have generally coplanar surfaces while the stop member 43 in combination with one leg of the platen 41 defines a protuberance receiving groove 46 into which an end such as the end 10a may be pressed while the platens 41 and 42 are heated until the face 18a rests against the unheated member 43.

Employing the method of the present invention, eminently satisfactory butt welds are quickly and easily prepared employing thermoplastic foams including polystyrene foams.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the butt welding of two elongate synthetic resinous thermoplastic foam elements having a longitudinal axis, the method comprising providing a first foam element having an end to be joined and a second foam element having an end to be joined, forming on the end of the first foam element a recess extending inwardly and generally axially and laterally, the elongate element forming on the end of the second element to be joined a protuberance having one surface adapted to mate with at least one surface of the recess, the mating surfaces extending generally transverse to the longitudinal axis of the elements, the protuberance extending outwardly in an axial direction for a distance less than the depth of the recess, the protuberance being of a sufficient size to prevent mating of the surfaces of the protuberance and the recess, subsequently heating a portion of an end surface of the second elongate member sufficient to heat plastify the thermoplastic foam and cause collapse of a portion thereof sufficient to deform the protuberance to mate with the recess, abutting the ends to be joined of the first and second members, thereby cooling at least a portion of the heat plastified foam in contact with the end to be joined of the first member, thereby adhering the first and second members together.

2. The method of claim 1 wherein at least one of the foam elements has disposed therein a generally planar reinforcement.

3. The method of claim 2 wherein each of the foam elements has disposed therein a generally planar reinforcement extending generally parallel to the longitudinal axis.

4. The method of claim 3 wherein the ends of the first and second foam elements are joined with the reinforcement generally disposed in the generally adjacent position.

5. The method of claim 4 wherein the reinforcement of the second element extends into the protuberance.

6. The method of claim 5 wherein the reinforcement in the adjacent joined elements are disposed in generally overlapping relationship.

* * * * *